(12) United States Patent
Saito et al.

(10) Patent No.: US 7,462,855 B2
(45) Date of Patent: Dec. 9, 2008

(54) OPTICAL RECORDING AND REPRODUCING APPARATUS, OPTICAL HEAD, OPTICAL RECORDING AND REPRODUCING METHOD AND SKEW DETECTION METHOD

(75) Inventors: Kimihiro Saito, Saitama (JP); Tsutomu Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 11/414,378

(22) Filed: May 1, 2006

(65) Prior Publication Data
US 2006/0255247 A1 Nov. 16, 2006

(30) Foreign Application Priority Data
May 13, 2005 (JP) ............................. 2005-141399
Apr. 11, 2006 (JP) ............................. 2006-109105

(51) Int. Cl.
*G11B 7/00* (2006.01)
*G11B 13/08* (2006.01)

(52) U.S. Cl. ............................... 250/559.37; 369/44.32; 369/112.23

(58) Field of Classification Search ................. 250/216, 250/559.37; 369/44.32, 53.19, 112.23
See application file for complete search history.

(56) References Cited

U.S. PATENT DOCUMENTS

| 5,125,750 | A | 6/1992 | Corle et al. | |
|---|---|---|---|---|
| 6,693,705 | B2* | 2/2004 | Sohn et al. | 356/124 |
| 7,002,886 | B2* | 2/2006 | Chu et al. | 369/53.19 |

| 2004/0013077 | A1 | 1/2004 | Saito et al. |
|---|---|---|---|
| 2004/0047271 | A1 | 3/2004 | Mizuno |

FOREIGN PATENT DOCUMENTS

| EP | 0 468 613 A2 | 1/1992 |
|---|---|---|
| JP | 5-189796 | 7/1993 |
| WO | WO 2006/018749 A1 | 2/2006 |

OTHER PUBLICATIONS

Isao Ichimura, et al., "Near-Field Phase-Change Optical Recording of 1.36 Numerical Aperture", Japanese Journal of Applied Physics, vol. 39, 2000, pp. 962-967.

(Continued)

*Primary Examiner*—John R Lee
(74) *Attorney, Agent, or Firm*—Oblon, Spivak, McClelland, Maier & Neustadt, P.C.

(57) ABSTRACT

An optical recording and reproducing apparatus for recording and/or reproducing an optical recording medium by irradiating light from a light source to the optical recording medium as near-field light from a near-field light irradiating unit includes a light source for emitting light, a first light-receiving unit for receiving and detecting returned light from the optical recording medium, a second light-receiving unit for receiving and detecting returned light from the near-field light irradiating unit, a control unit for detecting a relative skew between the optical recording medium and the near-field light irradiating unit based on a plurality of gap detection signals generated from divided detection signals of the second light-receiving unit and a drive control unit for outputting a drive signal to correct a skew of at least the near-field light irradiating unit to a drive unit in response to a skew detected in the control unit.

15 Claims, 8 Drawing Sheets

OTHER PUBLICATIONS

Masataka Shinoda, et al., "High Density Near Field Optical Disc Recording", Digest of ISOM2004, We-E-03, 2 pages.

Minoru Takeda, et al., "Progress in Electron Beam Mastering of 100 Gbit/inch$^2$ Density Disc", Japanese Journal of Applied Physics vol. 43, 2004, pp. 5044-5046.

Kimihiro Saito, et al., "A Simulation of Magneto-Optical Signals in Near-Field Recording", Japanese Journal of Applied Physics, vol. 38, Dec. 1999, pp. 6743-6749.

C.A. Verschuren, et al., "Towards cover-layer incident read-out of a dual-layer disc with a NA=1.5 solid immersion lens", Digest of ISOM2004, We-E-05, 2 pages.

Masataka Shinoda, et al., "High-Density Near-Field Readout over 50 GB Capacity Using Solid Immersion Lens with High Refractive Index", Japanese Journal of Applied Physics, vol. 42, Feb. 2003, pp. 1101-1104.

Tsutomu Ishimoto, et al., "Gap Servo System for a Biaxial Device Using an Optical Gap Signal in a Near Field Readout System", Japanese Journal of Applied Physics, vol. 42, May 2003, pp. 2719-2724.

T. Kawasaki et al., "Radial tilt and tangential tilt servo using four-axis actuator", Digest of ISMO2004, TH-J-02, 1 page.

Hyuck-Dong Kwon, et al., "Gap maintenance system using near-field optics and piezoelectric materials for near-field recording", Proceedings of SPIE, XP-002395989, vol. 4902, 2002, pp. 68-77.

* cited by examiner

OPTICAL RECORDING AND REPRODUCING APPARATUS, OPTICAL HEAD, OPTICAL RECORDING AND REPRODUCING METHOD AND SKEW DETECTION METHOD

CROSS REFERENCES TO RELATED APPLICATIONS

The present invention contains subject matter related to Japanese Patent Application JP 2005-141399 filed in the Japanese Patent Office on May 13, 2005, Japanese Patent Application JP 2006-109105 filed in the Japanese Patent Office on Apr. 11, 2006 the entire contents of which being incorporated herein by reference.

BACKGROUND OF THE INVENTION

1. Field of the Invention

The present invention relates to an optical recording and reproducing apparatus, an optical head, an optical recording and reproducing method and a skew detection method suitable for use with an optical recording medium which can be recorded and/or reproduced with irradiation of near-field light.

2. Description of the Related Art

Optical recording mediums (or magneto-optical recording mediums) represented by a CD (Compact Disc), a MD (Mini Disc) and a DVD (Digital Versatile Disc) are widely used as storage mediums to store music information, video information, data, programs and the like. In the systems for recording and reproducing these optical recording mediums, it has been customary that an objective lens opposes the recording surface of the optical recording medium in a non-contact fashion to read very small recording marks by detecting very small concavities and convexities formed on the recording surface of the optical recording medium or a reflectance change structure of a phase-change material. If a recording medium is a magneto-optical recording medium, it has been customary to read very small recording marks by detecting a magnetic domain structure in which a Kerr rotation angle changes.

In recent years, since it is requested that such optical recording medium should be larger in storage capacity and higher in recording density, technologies to read smaller recording marks from the optical recording medium with high resolution are now under examination.

The size of a beam spot of light irradiated on the optical recording medium is substantially given by $\lambda/NA$ where $\lambda$ is the wavelength of light irradiated on the optical recording medium and NA is the numerical aperture of a focusing lens to focus this light on the optical recording medium. Resolution also is in proportion to the value of $\lambda/NA$. The numerical aperture NA is expressed as:

$$NA = n \times \sin\theta$$

In the above equation, n is the refractive index of the medium and $\theta$ is the angle at which marginal ray is introduced into the optical recording medium by an objective lens. The NA is never greater than 1 insofar as the medium is the air and hence resolution has a limit. For this reason, in the optical recording and reproducing apparatus, its light source has been improved. For example, a wavelength of a semiconductor laser has been shortened and a numerical aperture of a focusing lens has been increased.

On the other hand, a so-called near-field optical recording and reproducing system using evanescent waves, that is, light attenuating exponentially from the interface is proposed as a method that can achieve a numerical aperture larger than 1. In this near-field optical recording and reproducing system, it is necessary to decrease a gap between the focusing lens and the surface of the optical recording medium considerably.

An optical recording and reproducing method using a solid immersion lens (hereinafter simply referred to as a "SIL") is proposed as a method of recording and reproducing an optical recording medium with irradiation of near-field light to the optical recording medium (see Cited Patent Reference 1 and Cited Non-Patent Reference 1, for example).

As an optical recording and reproducing recording medium which can be recorded and/or reproduced by irradiating near-field light from a near-field light irradiating unit such as the SIL thereto, there is proposed a phase-change type recording type optical recording medium shown in FIG. 1, for example.

FIG. 1 of the accompanying drawings is a schematic cross-sectional view showing an arrangement of an example of such phase-change type optical recording medium. An optical recording medium, generally depicted by reference numeral 10 in FIG. 1, includes a substrate 1 made of a suitable material such as glass or polycarbonate (PC) on which a reflection film 2 made of a suitable material such as aluminum (Al), a dielectric layer 3 made of a suitable material such as $SiO_2$, a phase-change material layer 4 made of a suitable material such as GeSbTe and a dielectric layer 5 made of a suitable material such as $SiO_2$ are laminated in that order. Alternatively, there is proposed a read-only optical recording medium shown in FIG. 2. FIG. 2 is a schematic cross-sectional view showing an arrangement of an example of such a read-only optical recording medium. This read-only optical recording medium, generally depicted by reference numeral 10 in FIG. 2, includes a substrate 1 made of a suitable material such as glass and polycarbonate (PC) on which a reflection layer 2 made of a suitable material such as aluminum (Al) with pits corresponding to recording information are formed is formed (see Cited Non-Patent References 2 and 3, for example) FIGS. 1 and 2 show the states in which a near-field light irradiating unit 26 such as the SIL is opposed to the surface of the optical recording medium 10 with a very small gap therebetween to irradiate incident light Li to the surface of the optical recording medium 10.

According to the report (see Cited Non-Patent Reference 4, for example), when the near-field light irradiating unit such as the SIL is in use, it is desirable that a space (gap) between the surface of the near-field light irradiating unit and the surface of the optical recording medium, that is, a gap should be made less than 1/10 of the wavelength of light irradiated onto the surface of the optical recording medium.

For this reason, when the wavelength of light is short, it is unavoidable that the surface of the optical recording medium and the surface of the near-field light irradiating unit are located with an extremely small gap therebetween. There is a large possibility that the near-field light irradiating unit such as the SIL will hit the surface of the optical recording medium. If the near-field light irradiating unit hits the surface of the optical recording medium, there is then the risk that the optical recording medium will be damaged at its portion in which information is recorded. In order to prevent or avoid the above-mentioned disadvantage, there is proposed an arrangement of an optical recording medium shown in FIG. 3 (see Cited Non-Patent Reference 5, for example).

FIG. 3 is a schematic cross-sectional view showing an arrangement of such optical recording medium. As shown in FIG. 3, a protective layer 8 having a thickness larger than approximately 1 μm is formed on the uppermost surface of the information recording surface of the optical recording medium 10. In FIG. 3, elements and parts identical to those of FIG. 1 are denoted by identical reference numerals and therefore need not be described.

In this case, as shown in FIG. 3, focus position of light irradiated by the near-field light irradiating unit 26 is set to the surface of the recording and reproducing layer, in the illustrated example, the surface of the phase-change material layer 4 through the protective layer 8. Also, it is necessary that the gap between the surface of the protective layer 8 of the optical recording medium 10 and the surface of the near-field light irradiating unit 26 made of a suitable device such as the SIL should be made, also in this case, less than approximately 1/10 of the wavelength of irradiated light.

On the other hand, there is proposed an arrangement in which a skew margin between the SIL and the surface of the optical recording medium can be kept by forming the tip end of the SIL like a cone (see Cited Non-Patent Reference 6, for example).

FIG. 4 is a schematic cross-sectional view showing an arrangement of an example of the above-mentioned arrangement. As shown in FIG. 4, the tip end portion of the SIL is shaped like a cone except a flat surface with a diameter D of approximately 40 μm, for example. According to the cone-like tip end portion of the SIL, it is possible to keep a skew margin between the surface of the SIL and the surface of the optical recording medium 10.

[Cited Patent Reference 1]: Japanese Published Patent Application No. 5-189796

[Cited Non-Patent Reference 1]: I. Ichimura et al., "Near-Field Phase-Change Optical Recording of 1.36 Numerical Aperture", Japanese Journal of Applied Physics, Vol. 39, pp. 962-967 (2000)

[Cited Non-Patent Reference 2]: M. Shinoda et al., "High Density Near-Field Optical Disc Recording", Digest of ISOM2004, We-E-03

[Cited Non-Patent Reference 3]: M. Furuki et al., "Progress in Electron Beam Mastering of 100 Gb/inch 2 Density Disc", Japanese Journal of Applied Physics, Vol. 43, pp. 5044-5046 (2004)

[Cited Non-Patent Reference 4]: K. Saito et al., "A Simulation of Magneto-Optical Signals in Near-Field Recording", Japanese Journal of Applied Physics, Vol. 38, pp. 6743-6749 (1999)

[Cited Non-Patent Reference 5]: C. A. Verschuren et al., "Towards cover-layer incident read-out of a dual-layer disc with a NA=1.5 solid immersion lens", Digest of ISOM2004, We-E-05

[Cited Non-Patent Reference 6]: M. Shinoda, "High-Density Near-Field Readout over 50GB Capacity Using Solid Immersion Lens with High Refractive Index", Japanese Journal of Applied Physics, Vol. 42, pp. 1101-1104 (2003)

SUMMARY OF THE INVENTION

However, as described in the Cited Non-Patent Reference 4, it is desirable that the gap between the near-field light irradiating unit and the surface of the optical recording medium should be made less than approximately 1/10 of the wavelength of irradiation light. When light with a wavelength of 405 nm is available as irradiation light, a distance between the near-field light irradiating unit 26 and the surface of the optical recording medium 10, that is, so-called gap g shown in FIG. 4 may become an extremely small gap of approximately 20 nm in length.

Accordingly, in this case, an allowable skew amount between the near-field light irradiating unit composed of the SIL and the optical recording medium is given by the following equation:

$$20 \text{ (nm)} \times 2/40(\mu m) \times 180/\pi \approx 0.057 \text{ (degree)}$$

From the above equation, it is to be understood that only the extremely small skew margin could be obtained.

In general, the CD (Compact Disc) has a skew margin of approximately ±1 degree and the DVD (Digital Versatile Disc) and a DB (Blu-ray Disc (Registered Trademark)) have a skew margin of approximately ±0.6 degree. That is, it is to be understood that the skew margin in the near-field optical recording and reproducing system is extremely small.

For this reason, if the optical recording medium has an inclination or a curve, there is then a possibility that the SIL and the surface of the optical recording medium will be brought in contact with each other by a very small skew generated when an objective lens is driven.

In view of the aforesaid aspects, the present invention intends to provide an optical recording and reproducing apparatus, an optical head, an optical recording and reproducing method and a skew detection method in which an inclination (skew) between an optical recording medium and a near-field light irradiating unit can be detected with ease.

In order to solve the above-described problems, according to the present invention, there is provided an optical recording and reproducing apparatus for recording and/or reproducing an optical recording medium by irradiating light from a light source to the optical recording medium as near-field light from a near-field light irradiating unit. This optical recording and reproducing apparatus includes a light source for emitting light, a near-field light irradiating unit for irradiating light from the light source to an optical recording medium as near-field light, a first light-receiving unit for receiving and detecting returned light from the optical recording medium, a second light-receiving unit for receiving and detecting returned light from the near-field light irradiating unit, a control unit for detecting a relative skew between the optical recording medium and the near-field light irradiating unit based on a plurality of gap detection signals generated from divided detection signals of the second light-receiving unit and a drive control unit for outputting a drive signal to correct a skew of at least the near-field light irradiating unit to a drive unit in response to a skew detected in the control unit.

Also, according to the present invention, the above-mentioned optical recording and reproducing apparatus includes a dividing optical element for dividing light from the light source to provide a plurality of light beams and in which at least one of light beams divided by this dividing optical element is irradiated to the optical recording medium as light having focal surfaces at the position shifted to at least one of the front and back directions relative to the recording surface of the optical recording medium.

Further, according to the present invention, the above-mentioned optical recording and reproducing apparatus further includes more than two light sources and in which light emitted from at least one light source of these light sources is irradiated to the optical recording medium as light having focal surfaces at the position shifted to at least one of the front and back directions relative to the recording surface of the optical recording medium.

Also, according to the present invention, there is provided an optical head for recording and/or reproducing an optical recording medium by irradiating light from a light source to the optical recording medium as near-field light from a near-field light irradiating unit. This optical head includes a light source for emitting light, a near-field light irradiating unit for irradiating light from the light source to an optical recording medium as near-field light, a first light-receiving unit for receiving and detecting returned light from the optical recording medium, a second light-receiving unit for receiving and detecting returned light from the near-field light irradiating unit and a drive control unit for outputting a drive signal to correct a skew of at least the near-field light irradiating unit to a drive unit in response to a relative skew, between the optical recording medium and the near-field light irradiating unit, detected by a plurality of gap detection signals generated from divided detection signals from the second light-receiving unit.

Also, according to the present invention, there is provided an optical recording and reproducing method for recording and/or reproducing an optical recording medium by irradiating light from a light source to the optical recording medium as near-field light from a near-field light irradiating unit. Returned light from the near-field light irradiating unit is divided to provide a plurality of gap detection signals and a relative skew between the optical recording medium and the near-field light irradiating unit is detected based on a difference among a plurality of gap detection signals.

Further, a skew detection method according to the present invention includes the steps of irradiating light from a light source to an optical recording medium as near-field light from a near-field light irradiating unit, dividing returned light from the near-field light irradiating unit to provide a plurality of gap detection signals and detecting a relative skew between the optical recording medium and the near-field light irradiating unit based on a difference among a plurality of gap detection signals.

As described above, according to the present invention, when the optical recording and reproducing apparatus records and/or reproduces the optical recording medium by irradiating light to the optical recording medium as near-field light, the returned light from the near-field light irradiating unit may be divided to provide a plurality of gap detection signals. Although a certain large area of the light-receiving area is required in order to divide the returned light as described above, it is possible to easily obtain the large light-receiving area by irradiating at least one of near-field irradiating lights generated when the optical recording medium with the protective layer formed on its surface is used or the dividing unit such as the hologram element is used or when more than two light sources are used to the optical recording medium as the light having the focal surfaces at the position shifted to at least one of the front and back directions relative to the recording surface of the optical recording medium.

Therefore, the optical recording and reproducing apparatus having the relatively simple arrangement becomes able to accurately detect the inclination (skew) between the near-field light irradiating unit and the surface of the optical recording medium by calculating the difference among a plurality of divided gap detection signals.

According to the optical recording and reproducing apparatus, the optical head, the optical recording and reproducing method and the skew detection method of the present invention, it is possible to detect the inclination (skew) between the near-field light irradiating unit and the surface of the optical recording medium by the apparatus having the relatively simple arrangement.

DESCRIPTION OF THE PREFERRED EMBODIMENTS

The embodiments of the present invention will be described below in detail with reference to the drawings but it is needless to say that the present invention is not limited to those embodiments.

Figure 1:
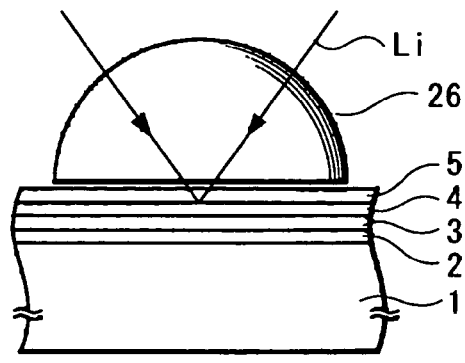
FIG. 1 is a schematic cross-sectional view showing an arrangement of a first example of an optical recording medium using near-field light according to the related art.
Figure 2:
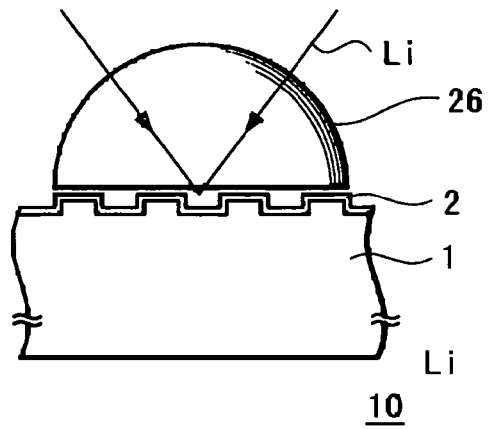
FIG. 2 is a schematic cross-sectional view showing an arrangement of a second example of an optical recording medium using near-field light according to the related art.
Figure 3:
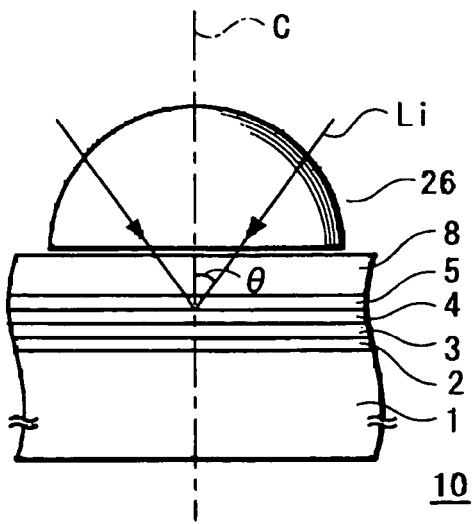
FIG. 3 is a schematic cross-sectional view showing an arrangement of a third example of an optical recording medium using near-field light according to the related art.
Figure 4:
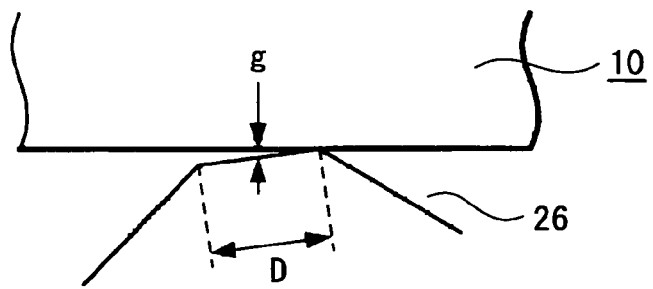
FIG. 4 is a schematic cross-sectional view showing an arrangement of a fourth example of an optical recording medium using near-field light according to the related art.
Figure 5:
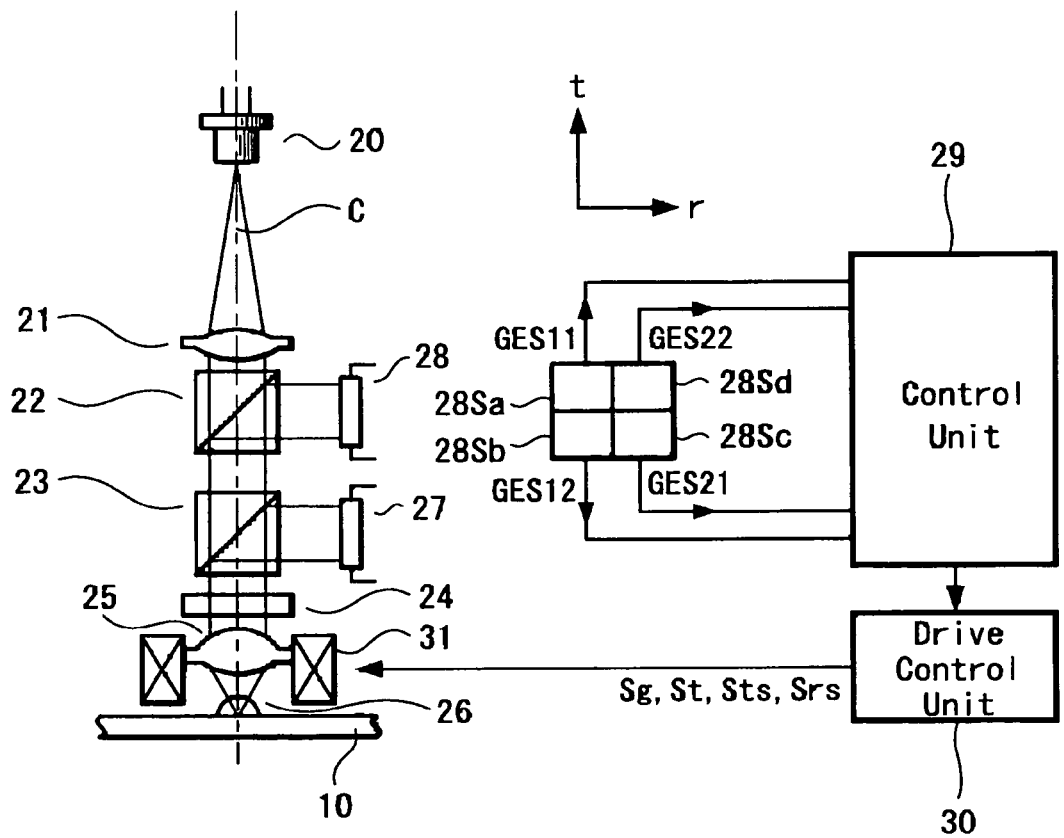
FIG. 5 is a schematic diagram showing an arrangement of an optical recording and reproducing apparatus according to an embodiment of the present invention.

FIG. 5 is a schematic diagram showing an arrangement of an optical recording and reproducing apparatus (including an optical head) according to an embodiment of the present invention.

As shown in FIG. 5, in this optical recording and reproducing apparatus, a light source 20 composed of a semiconductor laser, a collimator lens 21, a beam splitter 22, a polarizing beam splitter 23, a quarter-wave plate 24, an optical lens 25 and a near-field light irradiating unit 26 composed of suitable elements such as an SIL (Solid Immersion Lens) are located, in that order, on the optical axis of light emitted from the light source 20. Then, a first light-receiving unit 27 is located on the light path of light reflected by the polarizing beam splitter 23 and a second light-receiving unit 28 is located on the light path of light reflected by the beam splitter 22.

In the optical recording and reproducing apparatus having the above-mentioned arrangement, light emitted from the light source 20 is collimated as parallel light by the collimator lens 21, parallel light is passed through the beam splitter 22 and the polarizing beam splitter 23 to the quarter-wave plate 24, in which its phase is advanced ¼ of the wavelength and light from the quarter-wave plate 24 is irradiated to the recording surface of the optical recording medium as near-field light by the optical lens 25 and the near-field light irradiating unit 26.

Returned light reflected on the optical recording medium 10 is introduced through the near-field light irradiating unit 26, the optical lens 25 and the quarter-wave plate 24 into the polarizing beam splitter 23. Since the returned light from the optical recording medium 10 is passed twice through the quarter-wave plate 24 in its outward light path and inward light path and thereby its phase is advanced ½ of the wavelength, it is reflected by the polarizing beam splitter 23 and received by the first light-receiving unit 27.

On the other hand, since returned light from the near-field light irradiating unit 26, that is, returned light reflected in a total reflection fashion, in this case, the end face of the SIL opposing the optical recording medium 10 is very slightly rotated in its polarization direction when it is reflected on the end face of the SIL, it is passed through the polarizing beam splitter 23, reflected by the beam splitter 22 and received by the second light-receiving unit 28.

That is, in the example shown in FIG. 5, the polarizing beam splitter 23 and the beam splitter 22 constitute a light dividing unit 35 to divide returned lights from the optical recording medium 10 and the near-field light irradiating unit 26 such that the returned light from the optical recording medium 10 is divided by the polarizing beam splitter 23 and thereby received by the first light-receiving unit 27 and that the returned light from the end face of the near-field light irradiating unit 26 is reflected by the beam splitter 22 and thereby received by the second light receiving unit 28.

In the optical recording and reproducing apparatus shown in FIG. 5, the first light-receiving unit 27 may detect information recorded on the recording surface of the optical recording medium 10. On the other hand, the second light-receiving unit 28 may detect total reflection returned light which changes depending on a distance between the near-field light irradiating unit opposing the optical recording medium 10 and the optical recording medium, as will be described later on. Accordingly, it is possible to detect a distance between the surface of the optical recording medium 10 and the end face of the near-field light irradiating unit 26 such as the SIL, that is, so-called gap by using a quantity of returned light detected by the second light-receiving unit 28.

Figure 6A:
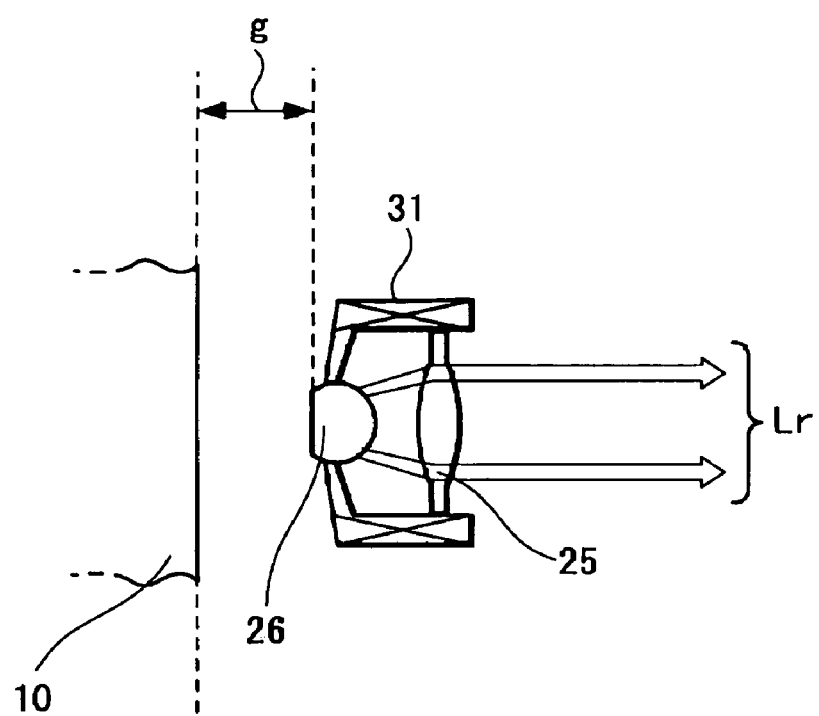
FIG. 6A is a schematic diagram of an arrangement showing a gap between an optical recording medium using near-field light and a near-field light irradiating unit.
Figure 6B:
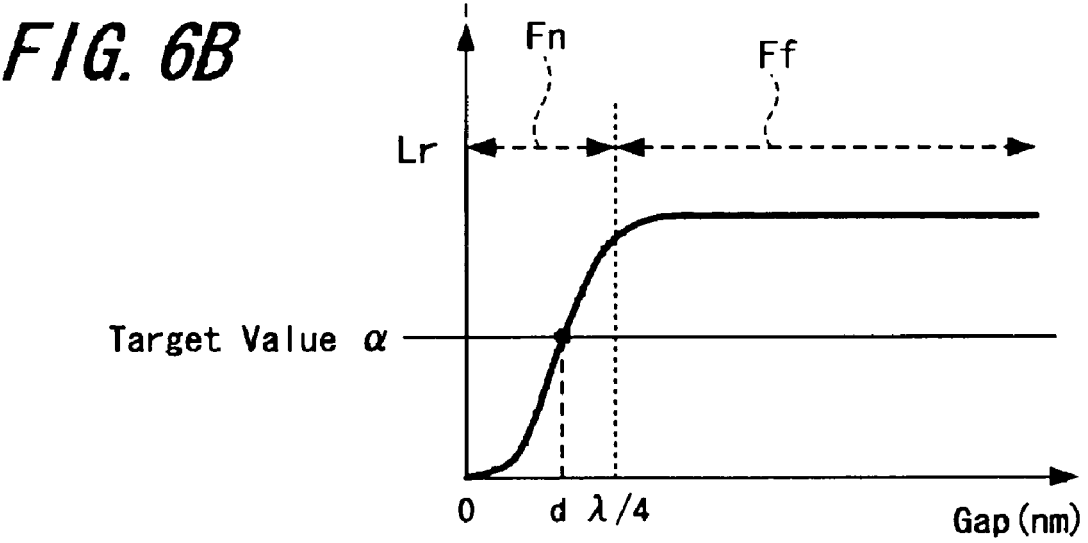
FIG. 6B is a diagram showing a relationship between a gap in the optical recording medium using near-field light and a quantity of returned light.

A principle by which a gap between the near-field light irradiating unit 26 opposing the optical recording medium 10 using the near-field light according to the present invention and the optical recording medium 10 can be detected will be described with reference to FIGS. 6A and 6B. FIG. 6A is a schematic diagram of an arrangement showing a gap between the optical recording medium 10 and the near-field light irradiating unit 26 at its end face opposing the optical recording medium 10 side. FIG. 6B is a diagram showing the change of a quantity of total reflection returned light relative to the gap.

In the area in which a space (gap) between the near-field light irradiating unit 26 and the optical recording medium 10 is larger than a distance in which near-field light with a wavelength of less than ¼ of a wavelength of incident light may be generated, that is, in a far-field area shown by a broken arrow Ff in FIG. 6B, light introduced into the near-field light irradiating unit 26 at an angle in which total reflection occurs on the end face of the near-field light irradiating unit 26 is reflected on this end face in a total reflection fashion and hence a quantity Lr of returned light may constantly be made constant as shown in FIG. 6B.

On the other hand, when the gap between the near-field light irradiating unit 26 and the optical recording medium 10 becomes less than approximately ¼ of a wavelength λ of incident light, which further becomes less than a distance in which near-field irradiating light occurs, part of light incident at the total reflection angle is leaked from the end face of the near-field light irradiating unit 26 so that the quantity Lr of returned light is decreased. Then, all incident lights are passed through the optical recording medium 10 at the position in which the near-field light irradiating unit 26 and the optical recording medium 10 are brought in contact with each other (that is, at the position in which the gap is decreased to zero).

The change of the quantity of returned light in the gap area in which such near-field light is generated occurs in a near-field area shown by a broken arrow Fn in FIG. 6B. There can be obtained a characteristic curve in which the quantity of returned light starts to gently decrease as the gap approaches the optical recording medium 10 from the position of approximately λ/4, the quantity of returned light decreases substantially linearly at the intermediate portion and in which the quantity of returned light again gently and gradually decreases in the area in which the gap approaches the surface of the optical recording medium 10 closer.

Accordingly, it is possible to detect the gap between the near-field light irradiating unit 26 and the optical recording medium 10 from the quantity of the returned light by using the fact that the quantity of total reflection returned light is changed substantially linearly relative to the gap length in a constant range.

Then, according to the present invention, returned light detected by this second light-receiving unit 28 is detected by quadrant light-receiving units, for example, shown by reference numerals 28Sa, 28Sb, 28Sc and 28Sd in FIG. 5.

Assuming now that GES11, GES12, GES21 and GES22 are signals detected by the respective light-receiving units 28Sa, 28Sb, 28Sc and 28Sd, then a signal which results from adding these detected signal, that is, a signal expressed by the following equation:

$$GES=GES11+GES12+GES21+GES22$$

becomes a gap error signal.

Figure 7:
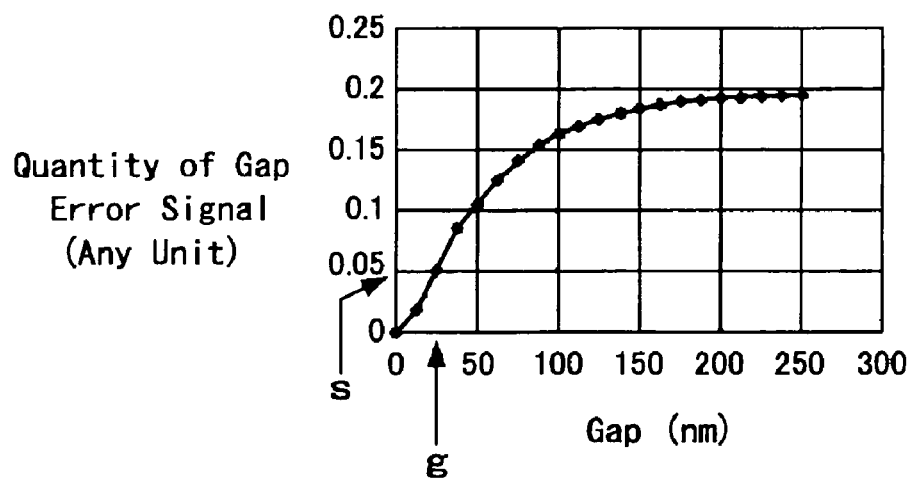
FIG. 7 is a graph showing an example of the manner in which an amount of a gap error signal detected in the optical recording and reproducing apparatus according to the embodiment of the present invention is changed relative to a skew gap.

FIG. 7 is a graph showing a characteristic curve obtained when the change of a quantity of a gap error signal relative to the gap was measured. As shown in FIG. 7, a control reference value S can be set relative to a gap target value g by a suitable means such as servo and a gap control amount can be obtained from a difference between the control reference value S and the above-mentioned gap error signal GES.

When the gap (space) between the near-field light irradiating unit 26 such as the SIL and the optical recording medium 10 is controlled, the control unit 29, for example, may calculate the gap error amount from the difference between the above-mentioned gap reference value and the gap error signal and a gap control signal Sg may be outputted from the drive control unit 30 to the drive unit 31 composed of suitable means such as a biaxial actuator to thereby control the gap.

Although not shown, the control unit 29 can similarly generate a tracking control signal St based on an information signal from the first light-receiving unit 27 and this tracking control signal St can be similarly outputted from the drive control unit 30 to the drive unit 31 to thereby carry out tracking control.

As described in "T. Ishimoto et. al., "Gap Servo System for a Biaxial Device Using an Optical Gap Signal in a Near Field Readout System" Japanese Journal of Applied Physics, Vol. 42, pp. 2719-2724 (2003)" (hereinafter referred to as a "PAPER 1"), various kinds of control methods, such as a method for stepwise controlling a gap from the far-field area to the near-field area by using a biaxial actuator, can be applied to the gap control method.

In the optical recording and reproducing apparatus according to the present invention, it is possible to detect the inclination (skew) between the near-field light irradiating unit 26 and the optical recording medium 10 can be detected by calculating the difference between the above-mentioned four signals from the quadrant light-receiving units 28Sa, 28Sb, 28Sc and 28Sd, for example.

As shown in FIG. 5, when the optical recording medium 10 is assumed to be a disc-like recording medium, for example, if an arrow R represents the radial direction (direction of radius) of the disc-like recording medium relative to the second light-receiving unit 28 and an arrow T perpendicular to the arrow R represents the tangential direction (tangential direction of recording tracks), then a skew error signal of the radial direction R may be obtained by the following equation:

$$GES(R)=GES11+GES12-(GES21+GES22)$$

Also, a skew error signal of the tangential direction T may be obtained by the following equation:

$$GES(T)=GES11+GES22-(GES12+GES21)$$

Based on these calculated results, the control unit 29 can generate skew error signals and the drive control unit 30 can output a radial direction skew control signal Srs and a tangential direction skew control signal Sts to the drive unit 31, thereby making it possible to correct skews.

Figure 8:
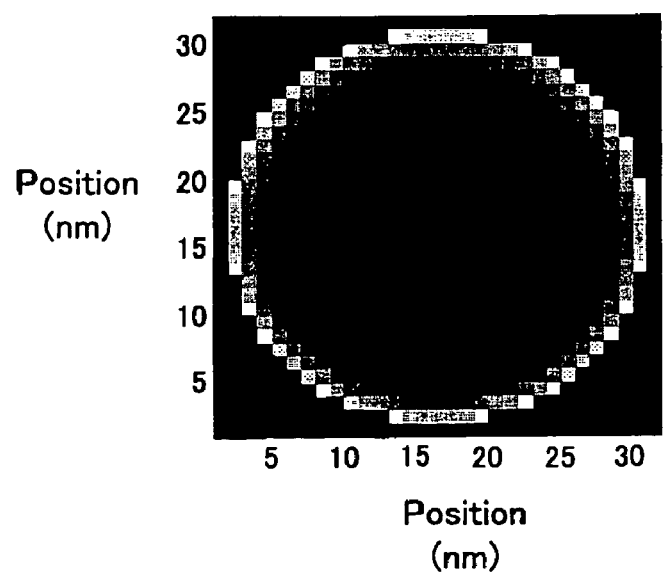
FIG. 8 is a microscopic representation showing an example of distribution of a quantity of returned light in the optical recording and reproducing apparatus according to the embodiment of the present invention.

When the near-field light irradiating unit 26 is not skewed relative to the optical recording medium 10, as FIG. 8 shows an example of a quantity of received light detected by the second light-receiving unit 28, it is to be understood that a quantity of received light is uniform in the peripheral portion and that a quantity of received light has a substantially point-symmetric distribution from the center. FIG. 8 is a microscopic representation showing the case in which the gap has a gap length of 20 nm.

Figure 9:
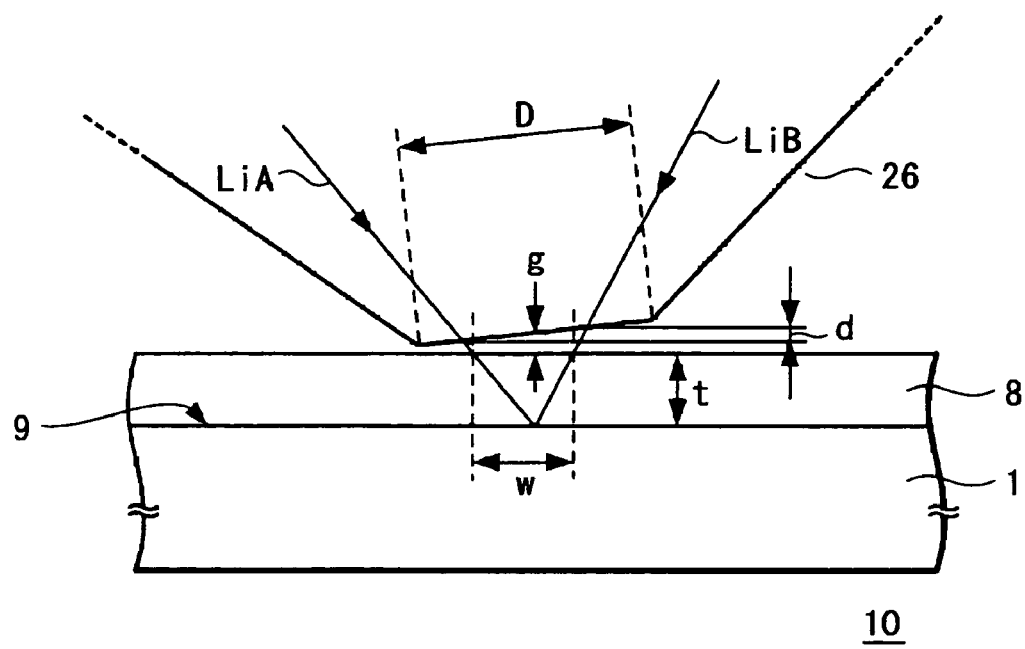
FIG. 9 is a schematic cross-sectional view of an arrangement to which reference will be made in explaining an optical recording and reproducing method according to the present invention.

FIG. 9 is a schematic cross-sectional view useful for explaining an optical recording and reproducing method according to the present invention. As shown in FIG. 9, let us consider the case in which a skew is produced between the near-field light irradiating unit 26, for example, the SIL at its end face opposing to the optical recording medium 10 and the surface of the optical recording medium 10. In this example, as shown in FIG. 9, the recording surface 9 on which concave and convex pits and recording marks on the phase-change material layer are formed is formed on the surface of the optical recording medium 10 and the protective layer 8 with an refractive index n is formed on the recording surface 9 so as to have a thickness t. In this case, light is irradiated on the surface of the optical recording medium 10 with a diameter w of a beam spot.

Figure 10:
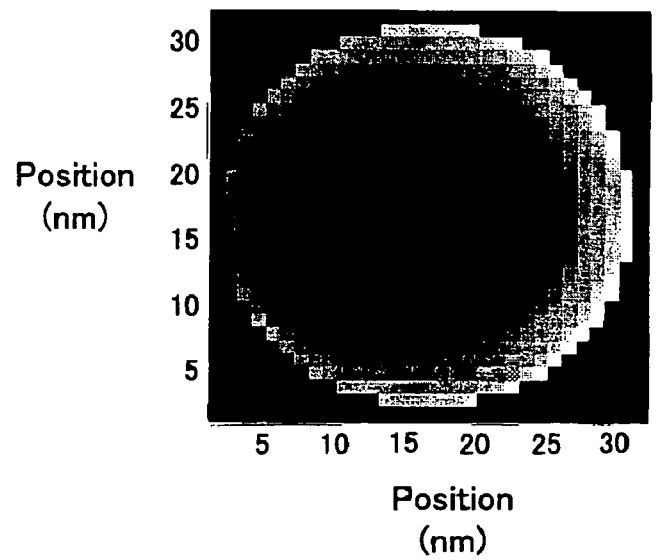
FIG. 10 is a microscopic representation showing an example of distribution of a quantity of returned light in the optical recording and reproducing apparatus according to the embodiment of the present invention.

FIG. 10 is a microscopic representation showing an example of distributions of returned light on the second light-receiving unit 28 shown in FIG. 5. Since gaps between the near-field light irradiating unit 26 such as the SIL and the surface of the optical recording medium 10 are different, distributions of marginal lights of focused light, that is, marginal lights shown by arrows LiA and LiB in FIG. 9 are biased as shown in FIG. 10. In this case, it is to be understood that intensity of returned light of marginal light, shown by the arrow LiB in FIG. 9, spaced apart from the surface of the optical recording medium 10 is large.

Figure 11:
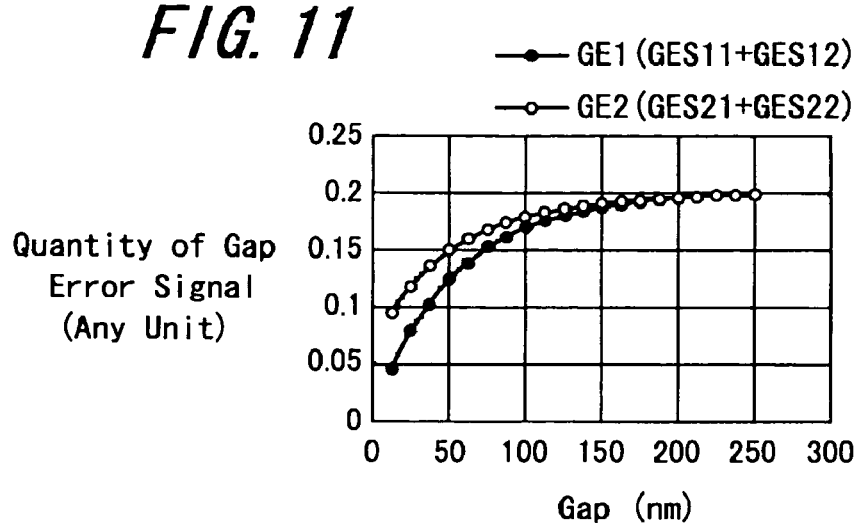
FIG. 11 is a graph showing an example of the manner in which an amount of a gap error signal detected in the optical recording and reproducing apparatus according to the embodiment of the present invention is changed relative to a skew gap.

FIG. 11 is a graph showing characteristic curves obtained when changes of respective gap error signal amounts relative to the gap g, that is, the distance between the central position of the end face of the SIL and the surface of the optical recording medium 10 were measured where the following equations $$GES1=GES11+GES12$$

$$GES2=GES21+GES22$$

are satisfied in the above-mentioned example shown in FIG. 5 in which the second light-receiving unit 28 has the quadrant detection areas 28Sa, 28Sb, 28Sc and 28Sd.

A study of FIG. 11 reveals that these gap error signal amounts are shifted in the horizontal axis direction due to the skew of the near-field light irradiating unit 26.

By carrying out control such that the difference among the divided detection signals may be removed, that is, the skew signal (=GES1−GES2) may be removed so as to skew the near-field light irradiating unit 26 such as the SIL in the opposite direction, it is possible to make the near-field light irradiating unit 26 become parallel to the optical recording medium 10.

Assuming now that t is the thickness of the protective layer 8 of the optical recording medium 10, n is the refractive index and NA is the numerical aperture of the focusing optical system including the near-field light irradiating unit 26, then the diameter w of the beam spot on the surface of the optical recording medium 10 shown in FIG. 9 is expressed by the following equation (1):

$$w=2t\times\tan(\sin^{-1}(NA/n)) \tag{1}$$

Also, assuming that θ is the skew between the optical recording medium 10 and the near-field light irradiating unit 26, then a gap difference d between the marginal lights LiA and LiB shown in FIG. 9 is expressed by the following equation (2):

$$d = \theta \times w \quad (2)$$

When the control method shown on the above-described PAPER 1, for example, is applied to the gap control method, a gap amount which the gap servo is unable to remove completely, that is, a fluctuated amount δ (peak-to-peak value) of the gap which may not be removed by the gap servo is substantially expressed by the following equation (3):

$$\delta = 2\text{nm} \quad (3)$$

Accordingly, the skew control remaining amount of the near-field light irradiating unit 26, in this case, the SIL is substantially expressed by the following equation (4):

$$\theta res = \tan^{-1}(\delta/w) \approx \delta/w \quad (4)$$

On the other hand, the gap g is set to be approximately 1/10 of the available wavelength, for example, about 20 nm according to the aforementioned Cited Non-Patent Reference 5. If the SIL is used as the near-field light irradiating unit 26 and D is a diameter of the SIL at its end face opposing the optical recording medium 10, then a maximum angle of an allowable skew is expressed by the following equation (5):

$$\tan^{-1}(2g/D) \approx 2g/D \quad (5)$$

In the skew control remaining amount, in order to avoid the near-field light irradiating unit 26 from hitting the optical recording medium 10, the following equation (6) should be satisfied:

$$2g/D > \delta/w \quad (6)$$

From the above-mentioned results, it is clear that the thickness t of the protective layer 8 formed on the surface of the optical recording medium 10 should satisfy the following equation:

$$t > \frac{\delta \times D}{4 \times g \times \tan\{\sin^{-1}(NA/n)\}}$$

For example, when the numerical aperture NA of the focusing optical system is 1.7 and the refractive index n of the protective layer 8 formed on the surface of the optical recording medium 10 is 1.8, it is to be understood that the thickness t of the protective layer 8 should be greater than approximately 174 nm.

On the other hand, even when the thickness t of the protective layer 8 formed on the surface of the optical recording medium 10 is less than approximately 174 nm, it is possible to similarly detect skews of the near-field light irradiating unit 26 by the following methods.

Figure 12:
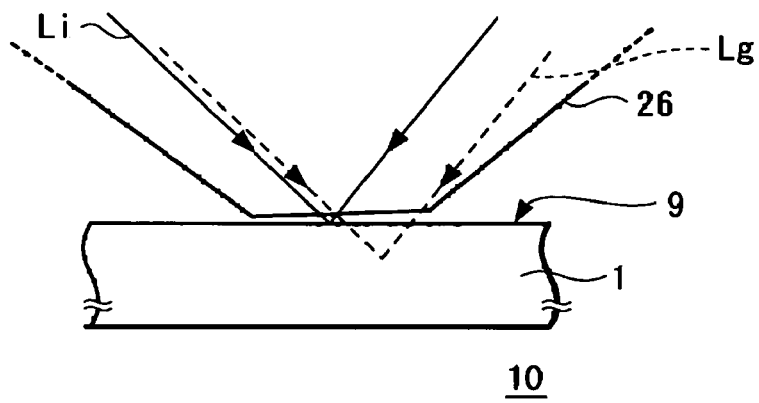
FIG. 12 is a schematic diagram showing a main portion of an arrangement of an optical recording and reproducing apparatus according to other embodiment of the present invention.
Figure 13:
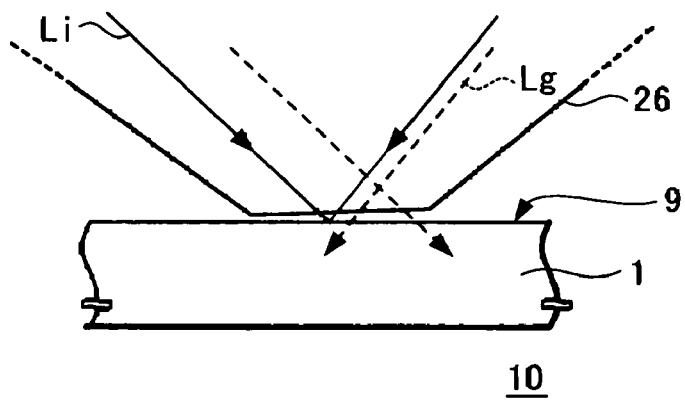
FIG. 13 is a schematic diagram showing a main portion of an arrangement of an optical recording and reproducing apparatus according to a further embodiment of the present invention.

Specifically, as shown in FIGS. 12 and 13, if the focusing position of light for use in detecting gap errors is shifted to at least one of the front and back directions relative to the recording surface 9 of the optical recording medium 10 by a certain amount of more than a predetermined amount, then it is possible to similarly carry out skew control by which the near-field light irradiating unit 26 and the optical recording medium 10 can be avoided from being brought in contact with each other. In FIGS. 12 and 13, elements and parts identical to those of FIG. 9 are denoted by identical reference numerals and therefore need not be described.

FIG. 12 shows the case in which gap detection light shown by an arrow Lg is irradiated to the optical recording medium 10 as light having focal surfaces on the side of the optical recording medium 10 ahead of the recording surface 9 of the optical recording medium 10, in this case, the inside of the substrate 1 relative to recording and/or reproducing incident light Li. FIG. 13 shows the case in which gap detection light Lg is irradiated to the optical recording medium 10 as light having focal surfaces within the near-field light irradiating unit 26 behind the recording surface 9 of the optical recording medium 10.

As described above, if the gap detection light is irradiated on the optical recording medium 10 as the light having the focal surfaces shifted to at least one of the front and back directions relative to the recording surface 9 of the optical recording medium 10, then the skew between the optical recording medium 10 and the near-field light irradiating unit 26 can be detected from the difference of the gap errors and thereby the optical recording medium 10 and the near-field light irradiating unit 26 can be prevented from contacting with each other.

Figure 14:
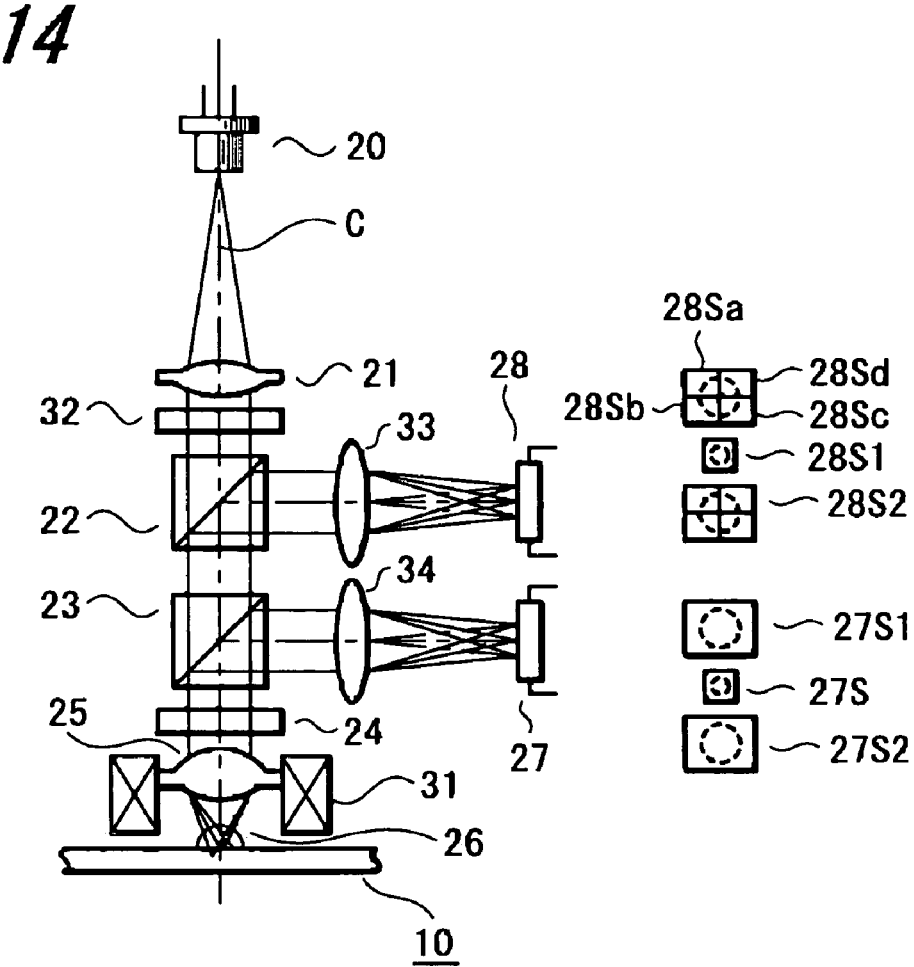
FIG. 14 is a schematic diagram showing an arrangement of an optical recording and reproducing apparatus according to yet a further embodiment of the present invention.

FIG. 14 is a schematic diagram showing an arrangement of an example of an optical recording and reproducing apparatus having the above-mentioned arrangement. In FIG. 14, elements and parts identical to those of FIG. 5 are denoted by identical reference numerals and therefore need not be described.

FIG. 14 shows an example of an arrangement of such optical recording and reproducing apparatus in which a dividing optical element 32 for dividing light emitted from the light source 20 is located between the collimator lens 21 and the polarizing beam splitter 22.

Figure 15:
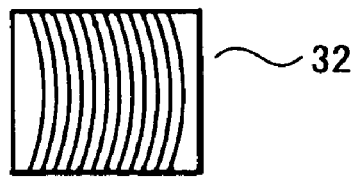
FIG. 15 is a schematic plan view showing an arrangement of an example of a separating unit that can be applied to the optical recording and reproducing apparatus according to the present invention.

Suitable devices such as a diffraction grating and a hologram element are available for this dividing optical element 32. FIG. 15 is a schematic plan view showing an example of an arrangement required when the hologram element is used as the dividing optical element 32 in the optical recording and reproducing apparatus shown in FIG. 14.

When light is divided by the dividing optical element 32 such as the hologram element as described above, the focal surfaces of divided light are located at the position shifted to at least one of the front and back directions relative to the recording surface (front surface of the optical recording medium 10 in FIG. 14) of the optical recording medium 10.

At that time, the first and second light-receiving units 27 and 28 are able to detect at their both sides, for example, the signals from the recording surface of the optical recording medium 10 and the quantities of returned lights of which focal surfaces are shifted in the directions divided by the dividing optical element 32. FIG. 14 an example in which the first and second light-receiving units 27 and 28 are located in order o detect the signals from the recording surface of the optical recording medium 10 and the quantities of the returned lights of which focal surfaces are shifted in the direction divided by the separating unit 32. In the first light-receiving unit 27, recording and/or reproducing returned light may be detected by a central light-receiving unit 27S and signals detected by light-receiving units 27S1 and 27S2 located at both sides of the first light-receiving unit 27 may be used in order to carry out tracking control or gap control, for example.

Also, in the second light-receiving unit 28, the difference between the gap error signals can be detected by light-receiving units 28Sa, 28Sb, 28Sc and 28Sd of relatively wide areas on one side shifted from the center of the optical axis, and the signal detected by the light-receiving unit located at the center of the optical axis, that is, the central light-receiving unit 28S1 and the signal detected by the light-receiving unit 28S2 of the opposite side of the light-receiving units 28Sa, 28Sb, 28Sc and 28Sd may be used in order to carry out gap control.

FIG. 14 shows an example of the arrangement in which optical lenses 33 and 34 are located between the polarizing beam splitter 23, the beam splitter 22 and the first and second light-receiving units 27, 28.

Figure 16:
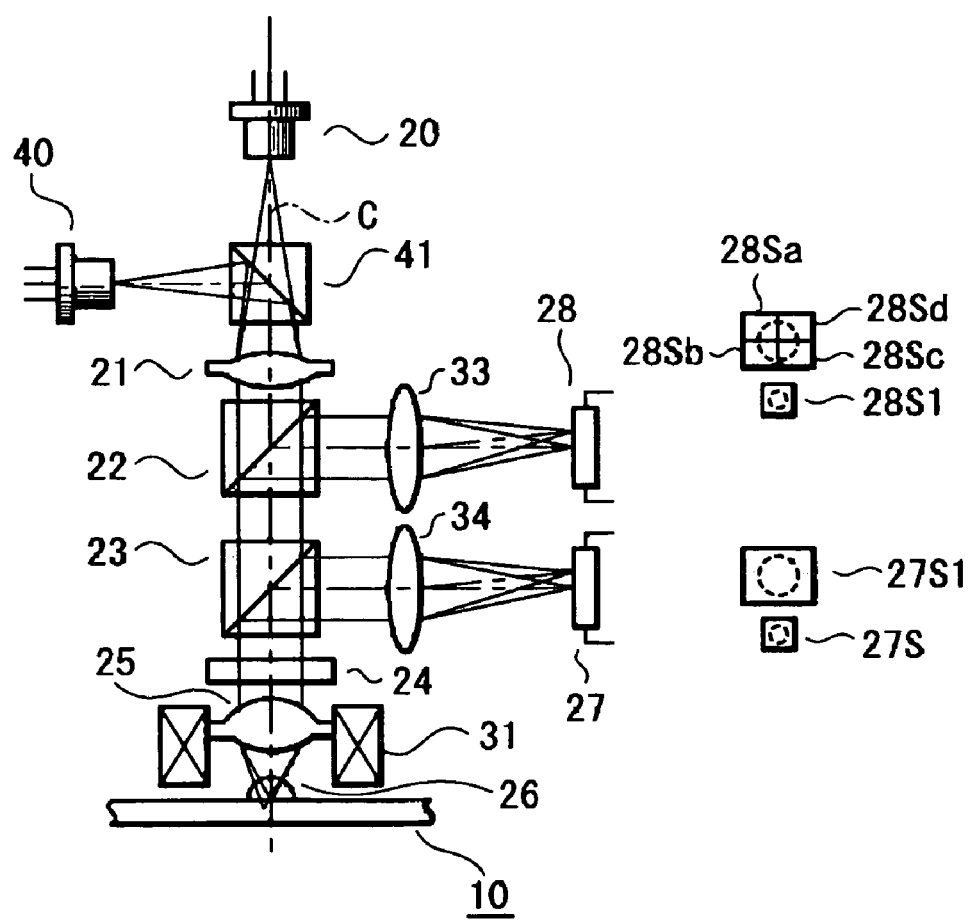
FIG. 16 is a schematic diagram showing an arrangement of an optical recording and reproducing apparatus according to a still further embodiment of the present invention.

Also, as shown in FIG. 16, recording and/or reproducing light and gap error detection light can be irradiated to the optical recording medium 10 from the near-field light irradiating unit 26 by using two light sources 20 and 40. In FIG. 16, elements and parts identical to those of FIG. 14 are denoted by identical reference numerals and therefore need not be described. In this case, lights emitted from the two light sources 20 and 40 are supplied to a light path synthesizing unit 41, in which they are synthesized and thereby introduced into the collimator lens 21. If the spaces between the light path synthesizing unit 41 and the two light sources 20 and 40 are changed, then light emitted from one light source 20 can be irradiated to the optical recording medium 10 as light having focal surfaces on the recording surface of the optical recording medium 10 and light emitted from the other light source 40 can be irradiated to the optical recording medium 10 as light having focal surfaces at the position shifted to at least one of the front and back surfaces relative to the recording surface of the optical recording medium 10.

Then, in this case, the first and second light-receiving units 27 and 28 may detect the signal from the recording surface of the optical recording medium 10 and the quantity of returned light having the focal surfaces shifted from the recording surface of the optical recording medium 10. FIG. 16 shows an example in which the first and second light-receiving units 27 and 28 are located in order to detect the signal from the recording surface of the optical recording medium 10 and the quantity of returned light having the focal surfaces shifted from the recording surface of the optical recording medium 10. For example, in the first light-receiving unit 27, recording and/or reproducing returned light may be detected by the central light-receiving unit 27S and a signal detected by the light-receiving unit 27S1 of one side may be used for carrying out tracking control or gap control.

Also, in the second light-receiving unit 28, the difference between the gap error signals can be detected by light-receiving units 28Sa, 28Sb, 28Sc and 28Sd of relatively wide areas on one side of the second light-receiving unit 28, and a signal detected by the other light-receiving unit 28S1 may be used in order to carry out gap control.

The optical recording and reproducing apparatus having the arrangement shown in FIGS. 14 and 16 are able to accurately detect the skew between the optical recording medium 10 and the near-field light irradiating unit 26 and hence the optical recording medium 10 and the near-field light irradiating unit 26 can be avoided from contacting with each other in exactly the same manner as the skew between the optical recording medium with the protective layer formed thereon and the near-field light irradiating unit is detected.

In order to control the skew of the near-field light irradiating unit 26 such as the SIL (solid immersion lens), as described in "T, Kawasaki et al., "Radial tilt and tangential tilt servo using four-axis actuator", Digest of ISOM2004, Th-J-(02)", it is possible to use a method that employs a four-axis actuator having a movable range in the four axes, that is, the tracking direction, the focusing (gap) direction, the tangential skew direction and the radial skew direction. Alternatively, it is possible to use proper methods such as a method for mounting a biaxial actuator on a movable block that can automatically adjust the tangential skew direction and the radial skew direction.

Although gap control and skew control of the SIL and the like can be carried out at the same time so as to prevent the near-field light irradiating unit 26 such as the SIL and the optical recording medium 10 from being brought in contact with each other during the optical recording medium 10 is being recorded and/or reproduced, it is necessary to avoid the near-field light irradiating unit 26 such as the SIL and the optical recording medium 10 from being contacted with each other when the near-field light irradiating unit 26 approaches the optical recording medium 10.

To this end, when the SIL approaches the optical recording medium 10, that is, when the SIL moves from right to left on the horizontal axis in the diagram of FIG. 11 showing the change of the quantity of the gap signal, in the optical recording and reproducing apparatus having the aforementioned arrangement of the present invention shown in FIG. 5, if gap control is carried out by using the signal, of the four signals of the signals GES11, GES12, GES21 and GES22 detected by the second light-receiving unit 28, of which signal level is lowered earliest and control of the skew of the near-field light irradiating unit such as the SIL is carried out, then it is possible to avoid the optical recording medium and the near-field light irradiating unit from being contacted with each other during the optical recording medium is recorded and/or reproduced.

As set forth above, according to the present invention, a plurality of gap detection signals may be obtained by dividing the returned light distribution, the difference between these gap detection signals may be used as the signal to detect the skew between the surface of the near-field light irradiating unit such as the SIL and the surface of the optical recording medium and the skew of the near-field light irradiating unit may be controlled based on the skew detection signal. Therefore, it is possible to provide highly-reliable optical recording and reproducing apparatus and optical recording and reproducing method by which the near-field light irradiating unit and the optical recording medium can be avoided from contacting with each other and which can record and reproduce the optical recording medium at high density based on the stable near-field optical recording and reproduction.

The optical recording and reproducing apparatus, the optical head, the optical recording and reproducing method and the skew detection method according to the present invention are not limited to the above-mentioned examples and a SIM (Solid immersion Mirror) also can be used as the near-field light irradiating unit, for example, in addition to the above-mentioned SIL (Solid Immersion Lens). Also, it is needles to say that the present invention can be variously modified and changed without departing from the arrangement of the present invention.

As described above, according to the optical recording and reproducing apparatus, the optical head, the optical recording and reproducing method and the skew detection method of the present invention, it is possible to detect the inclination (skew) between the near-field light irradiating unit and the surface of the optical recording medium by the apparatus having the relatively simple arrangement.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording and reproducing apparatus for recording and/or reproducing an optical recording medium by irradiating light from a light source to the optical recording medium as near-field light from a near-field light irradiating unit, comprising:

a light source configured to emit light;

a near-field light irradiating unit configured to irradiate light from said light source to an optical recording medium as near-field light;

a first light-receiving unit configured to receive and detect returned light from said optical recording medium;

a second light-receiving unit configured to
receive and detect returned light from said near-field light irradiating unit, and generate a plurality of detection signals from said detected returned light from said near-field light irradiating unit;

a control unit configured to
generate a plurality of gap detection signals by combining said plurality of detection signals of said second light-receiving unit,
detect a relative skew between said optical recording medium and said near-field light irradiating unit based on the plurality of gap detection signals; and a drive control unit for outputting a drive signal to correct a skew of at least said near-field light irradiating unit to a drive unit in response to a skew detected in said control unit.

2. The optical recording and reproducing apparatus according to claim 1, further comprising a dividing optical element for dividing light from said light source into a plurality of light beams and wherein at least one divided light beam of light beams divided by said dividing optical element is irradiated to said optical recording medium as light having a plurality of focal points on a plurality of focal surfaces parallel to a recording surface of said optical recording medium, said focal surfaces being at a position displaced to at least one of front and back directions relative to the recording surface of said optical recording medium.

3. The optical recording and reproducing apparatus according to claim 1, further comprising more than two said light sources and wherein light emitted from at least one light source of said light sources is irradiated to said optical recording medium as light having a plurality of focal points on a plurality of focal surfaces parallel to a recording surface of said optical recording medium, said focal surface being at a position displaced to at least one of front and back directions relative to the recording surface of said optical recording medium.

4. The optical recording and reproducing apparatus according to claim 1, wherein said second light-receiving unit includes a plurality of divided light-receiving surfaces to receive light, detection signals being respectively outputted from said divided light-receiving surfaces.

5. The optical recording and reproducing apparatus according to claim 1, wherein said near-field light irradiating unit comprises a solid immersion lens.

6. The optical recording and reproducing apparatus according to claim 1, further comprising a light dividing unit for dividing returned lights from said optical recording medium and said near-field light irradiating unit such that returned lights from said optical recording medium are received by said first light-receiving unit and that returned lights from said near-field light irradiating unit are received by said second light-receiving unit.

7. An optical head for recording and/or reproducing an optical recording medium by irradiating light from a light source to the optical recording medium as near-field light from a near-field light irradiating unit, comprising:
a light source configured to emit light;
a near-field light irradiating unit configured to irradiate light from said light source to an optical recording medium as near-field light;
a first light-receiving unit configured to receive and detect returned light from said optical recording medium;
a second light-receiving unit configured to
receive and detect returned light from said near-field light irradiating unit and
generate a plurality of detection siguals from said detected returned light from said near-field light irradiating unit; and
a drive control unit configured to output a drive signal to correct a skew of at least said near-field light irradiating unit to a drive unit in response to a skew detected from a plurality of gap detection signals generated by predetermined combinations of the plurality of detection signals from said second light-receiving unit.

8. The optical head according to claim 7, further comprising a dividing optical element for dividing light from said light source into a plurality of light beams and wherein at least one divided light beam of light beams divided by said dividing optical element is irradiated to said optical recording medium as light having a plurality of focal points on a plurality of focal surfaces parallel to a recording surface of said optical recording medium, said focal surfaces being at a position shifted to at least one of front and back directions relative to the recording surface of said optical recording medium.

9. The optical head according to claim 7, further comprising more than two said light sources and wherein light emitted from at least one light source of said light sources is irradiated to said optical recording medium as light having a plurality of focal points on a plurality of focal surfaces parallel to a recording surface of said optical recording medium, said focal surfaces being at a position displaced to at least one of front and back directions relative to the recording surface of said optical recording medium.

10. The optical head according to claim 7, wherein said second light-receiving unit includes a plurality of divided light-receiving surfaces to receive light, detection signals being respectively outputted from said divided light-receiving surfaces.

11. The optical head according to claim 7, wherein said near-field light irradiating unit comprises a solid immersion lens.

12. The optical head according to claim 7, wherein said optical head further divides returned lights from said optical recording medium and said near-field light irradiating unit such that returned lights from said optical recording medium are received by said first light-receiving unit and that returned lights from said near-field light irradiating unit are received by said second light-receiving unit.

13. An optical recording and reproducing method for recording and/or reproducing an optical recording medium by irradiating light from a light source to the optical recording medium as near-field light from a near-field light irradiating unit comprising the steps of:
dividing returned light from said near-field light irradiating unit;
detecting said returned light;
generating a plurality of detection signals in accordance with said detected returned light;
generating a plurality of gap detection signals based on the plurality of detection signals; and
detecting a relative skew between said optical recording medium and said near-field light irradiating unit based on a difference among said plurality of gap detection signals.

14. The optical recording and reproducing method according to claim 13, wherein said optical recording medium has an arrangement in which a protective layer made of at least a light transmittance material is formed on a recording surface.

15. A skew detection method comprising the steps of:
- irradiating light from a light source to an optical recording medium as near-field light from a near-field light irradiating unit;
- dividing returned light from said near-field light irradiating unit;
- detecting the divided returned light to generate a plurality of detection signals generating a plurality of gap detection signals based on the plurality of detection signals; and
- detecting a relative skew between said optical recording medium and said near-field light irradiating unit based on a difference among said plurality of gap detection signals.

* * * * *